United States Patent
Reuter et al.

[11] Patent Number: 6,007,146
[45] Date of Patent: Dec. 28, 1999

[54] REMOVABLE HARDTOP FOR AN AUTOMOBILE

[75] Inventors: Dieter Reuter, Ehningen; Peter Reutlinger, Bretten; Stefan Guelsdorf, Sindelfingen, all of German Dem. Rep.

[73] Assignee: Dr. Ing. h.c.F. Porsche AG, Weissach, Germany

[21] Appl. No.: 09/040,415

[22] Filed: Mar. 18, 1998

[30] Foreign Application Priority Data

Mar. 19, 1997 [DD] German Dem. Rep. .......... 197 11 352

[51] Int. Cl.⁶ .............. B60J 07/00; B60R 07/02
[52] U.S. Cl. ............. 296/210; 296/37.8; 296/37.16
[58] Field of Search ................ 296/37.16, 37.8, 296/210, 102, 103

[56] References Cited

U.S. PATENT DOCUMENTS

| | | |
|---|---|---|
| 2,511,460 | 6/1950 | Cancelli et al. . |
| 3,065,021 | 7/1962 | Geiger . |
| 3,328,073 | 6/1965 | Einhorn et al. ................ 296/136 |
| 4,618,181 | 10/1986 | Tokuda et al. . |
| 4,634,174 | 1/1987 | Kamiya . |
| 5,033,788 | 7/1991 | Raj ................................ 296/210 X |
| 5,076,631 | 12/1991 | Lord, Jr. ............................ 296/37.8 |
| 5,171,054 | 12/1992 | Wilson ............................. 296/37.16 |
| 5,205,607 | 4/1993 | Takeuchi . |
| 5,498,050 | 3/1996 | Maruyama et al. . |
| 5,544,934 | 8/1996 | Murkett et al. . |
| 5,803,534 | 9/1998 | Murkett et al. .................... 296/215 |

FOREIGN PATENT DOCUMENTS

| | | |
|---|---|---|
| 1 530 674 | 4/1969 | Germany . |
| 37 32 581 | 4/1989 | Germany . |
| 38 16 060 | 11/1989 | Germany . |

Primary Examiner—D. Glenn Dayoan
Assistant Examiner—Lori L. Coletta
Attorney, Agent, or Firm—Evenson, McKeown, Edwards & Lenahan, P.L.L.C.

[57] ABSTRACT

A removable hardtop for an automobile has a rear window and can be secured to the adjoining body via releasable latches. To stiffen the hardtop in the transverse direction, the hardtop is provided with a parcel shelf below the rear window. The shelf joins at least the two lengthwise side parts of the hardtop with one another.

14 Claims, 4 Drawing Sheets

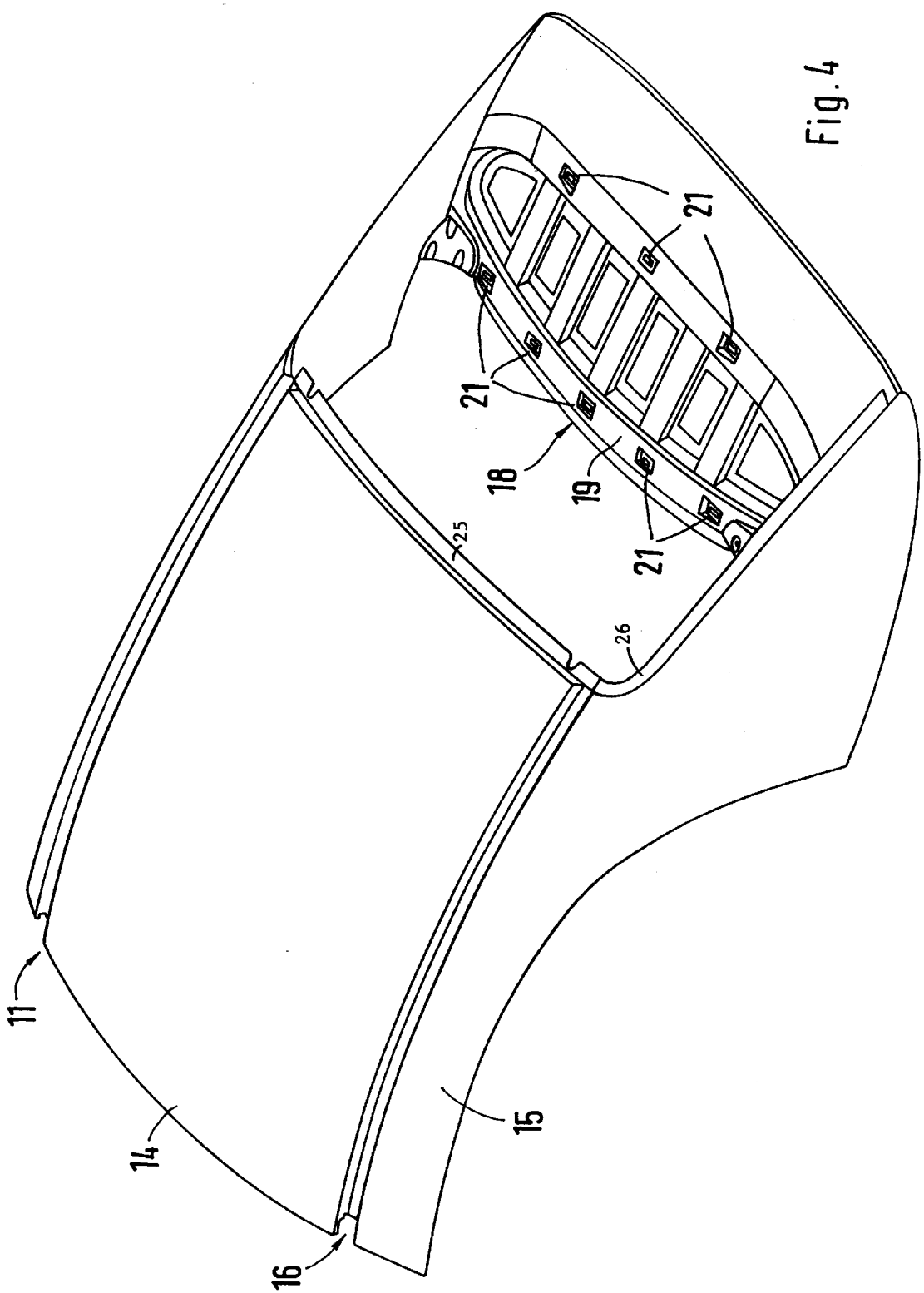

REMOVABLE HARDTOP FOR AN AUTOMOBILE

BACKGROUND AND SUMMARY OF THE INVENTION

This application claims the priority of German patent document 197 11 352.4 filed on Mar. 19, 1997, the disclosure of which is expressly incorporated by reference herein.

The invention relates to a removable hardtop for an automobile; and more particularly to a removable hardtop having a rear window and being securable to the adjoining body by releasable latches.

Hardtops are made of plastic or metal. They are used in particular to enclose convertibles when the weather during the winter months does not permit the folding top to be lowered to enjoy the fresh air, a possibility offered by a convertible with the folding top down. During this time however a hardtop offers at least the comfort of a sedan by comparison with a folding top in the raised position, especially as regards acoustics and heat loss.

German patent document DE 37 32 581 A1 teaches a removable hardtop for a convertible, with the lower rear edge of the hardtop surrounding the passenger compartment having the shape of an arc, as viewed from above.

This arrangement suffers from the disadvantage that the rear side parts of the hardtop that rest on the vehicle bend relatively easily, especially when driving, causing twisting and noise. Thus, there is a need for a hardtop in which considerable stiffening of the hardtop is achieved, especially in the transverse direction.

This and other needs have been met according to the instant invention by providing a removable hardtop for an automobile, comprising: a rear window; a pair of longitudinally-extending side parts located on opposite transverse sides of said rear window, respectively; and a parcel shelf arranged below said rear window and connecting at least said pair of side parts.

This and other needs have also been met according to the instant invention by providing a removable hardtop for an automobile, comprising: a hardtop body having a pair of side portions which at least partially define opposite transverse edges of an opening for a rear window, said side portions extending at least partially downwardly from said transverse edges; and a shelf arranged below said opening, said shelf extending transversely between said pair of side portions and being coupled to each of said side portions.

A primary advantage achieved according to the invention is that, by providing a parcel shelf in the lower rear area of the hardtop, a much stiffer hardtop is created that can better handle the forces that develop during driving. At the same time, the parcel shelf provides an additional area for storage. The parcel shelf covers the front portion of the folding top which is stored beneath, creating a homogenous appearance that is suitable for the coupe.

The parcel shelf completely covers the space behind the rear seats, so that no small parts can enter the storage space for the top located beneath.

By mounting the latches on the parcel shelf on the hardtop, these parts can be preassembled outside the vehicle, thus simplifying assembly. A hardtop with this design lends to the automobile the appearance of a coupe. The supporting part of the parcel shelf, permanently connected to the side parts of the hardtop, achieves a hardtop made of sheet aluminum which no longer exhibits any rebound behavior when painted and thus has a higher dimensional stability.

Other objects, advantages and novel features of the present invention will become apparent from the following detailed description of the invention when considered in conjunction with the accompanying drawings.

BRIEF DESCRIPTION OF THE DRAWINGS

FIG. 4 is another perspective view from the rear of the hardtop with the upper covering of the shelf removed.

DETAILED DESCRIPTION OF THE DRAWINGS

Figure 1:
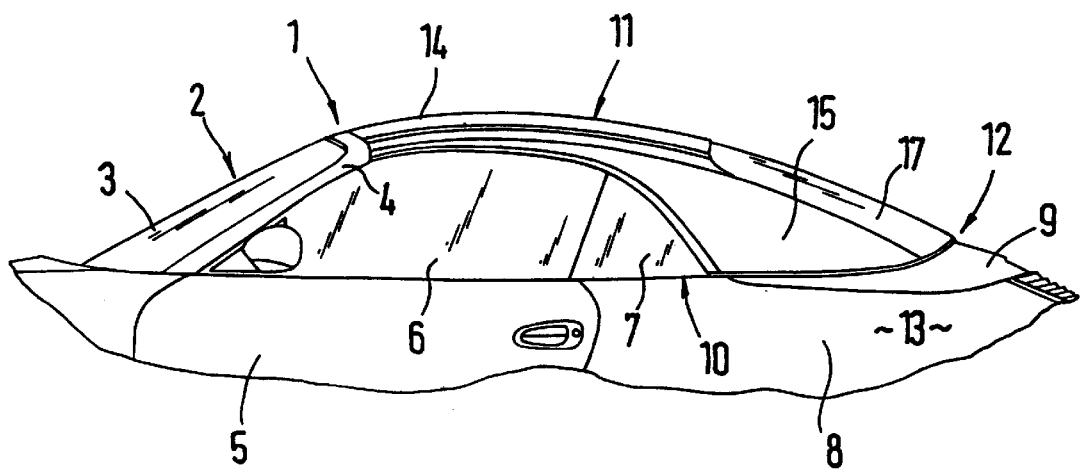
FIG. 1 is a partial side view of an automobile with a hardtop mounted in place.

The automobile 1 shown in FIG. 1 comprises a body 2 composed in the area shown of a windshield frame 4 provided with a windshield 3, a side door 5 with a door windowpane 6, a rear side window 7, a rear side part 8, and a storage compartment lid 9.

A removable hardtop 11 extends above a belt line 10, said hardtop extending from windshield frame 4 approximately up to front edge 12 of storage compartment lid 9. Hardtop 11 is secured to windshield frame 4 and body 2 by releasable latches, and can then be placed on open body 2 when the folding top, not shown in greater detail, assumes its storage position in which it is folded back into the rear. In the storage position, the folding top is located in a rear storage compartment 13 that is covered at least partially on top by storage compartment lid 9.

In the illustrated embodiment, the hardtop consists essentially of a middle part 14 and two side parts 15, with side parts 15 being connected to middle part 14 in the vicinity of roof channels 16 running lengthwise. Alternatively, the hardtop may be formed as a single integral unit, for example by molding or by stamping a single sheet. Both roof channels 16 are closed on top by covered strips, not shown in greater detail. Middle part 14 and both side parts 15 are made of thin-walled stamped sheet aluminum, joined by rivets in the vicinity of roof channels 16 or by welding, gluing, or the like. A large, rigid rear window 17 is located in the rear area of hardtop 11, said window being held above and at the sides by means of an adhesive body against receiving flanges 25, 26 of the middle part 14 and side parts 15, respectively.

To stiffen hardtop 11, a parcel shelf 18 is provided according to the invention at the lower rear edge of hardtop 11 below rear window 17, said shelf connecting at least the two side parts 15 with one another. Parcel shelf 18 located below rear window 17 comprises a lower supporting part 19 and an upper covering 20.

The panel-shaped supporting part 19 is provided with a plurality of stiffening ribs and is permanently connected with the lower edges of the two side parts 15. This can be accomplished by welding, riveting, screwing, gluing or the like. Rear window 17 also abuts the rear edge of supporting part 19 with the interposition of an adhesive body, with rear window 17 projecting beyond supporting part 19 at the rear in portions (FIG. 3).

Covering 20 is formed by a plastic part provided at least on its upper side with a coating made of covering material e.g. foam, rubber, any type of elastomer or polymer, etc. The plastic part could also be covered with carpeting or the like. Covering 20 is secured to supporting part 19 by releasable fastening elements such as screws, clips, or the like.

Figure 3:
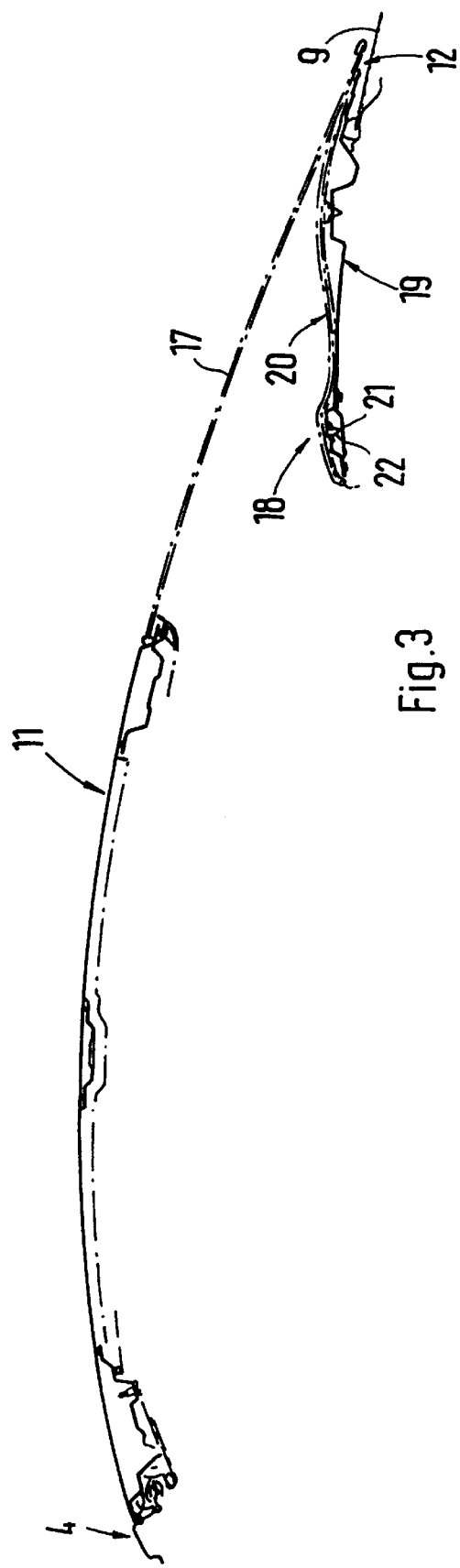
FIG. 3 is a section along line III—III in FIG. 2.

According to FIG. 3, recesses 21 are provided locally on supporting part 19, with fastening clips 22 being inserted into said recesses. The fastening clips may optionally be formed integrally with the covering 20 out of the same material.

Parcel shelf 18 extends only in a partial rear area of the lengthwise edges of side parts 15 of hardtop 11 that are located at the level of belt line 10.

Figure 2:
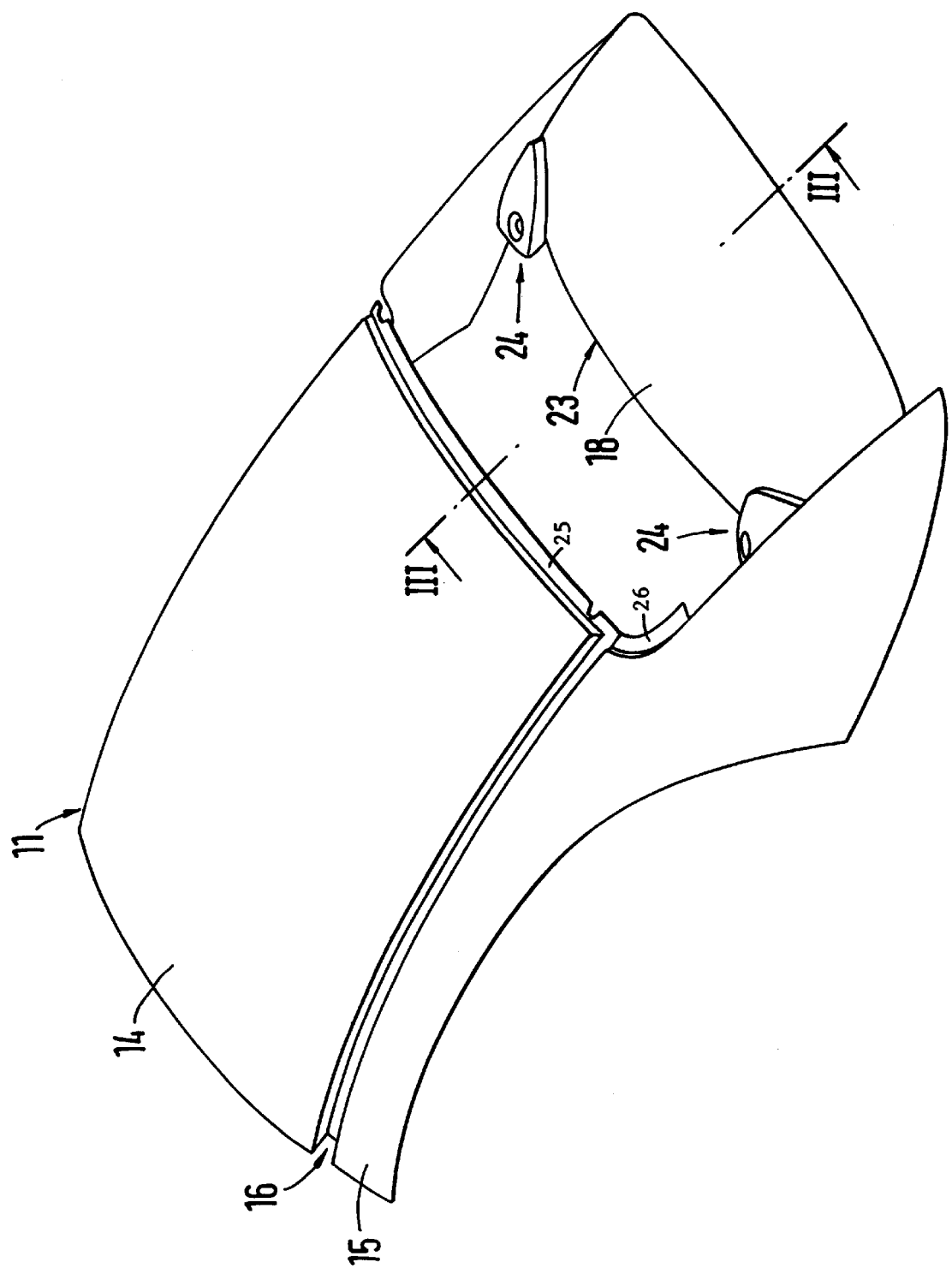
FIG. 2 is a perspective view from the rear of the hardtop with a parcel shelf according to a preferred embodiment of the invention.

According to FIGS. 2 and 4, the components of releasable latches 24 mounted on the hardtop are provided at front edge 23 of parcel shelf 18, namely on both laterally external lengthwise sides.

Parcel shelf 18, when hardtop 11 is mounted, covers the front portion of the folding top which is folded back, located beneath, and not shown in greater detail. The front edge of parcel shelf 18 abuts the covering for a rollover protection device located beneath, said covering being located forward and extending transversely, but does not cover said covering. Mounted hardtop 11 overlaps front edge 12 of storage compartment lid 9 in portions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A removable hardtop for an automobile, comprising:
   a rear window;
   a pair of longitudinally-extending side parts located on opposite transverse sides of said rear window, respectively; and
   a parcel shelf arranged below said rear window and connecting at least said pair of side parts.

2. The hardtop according to claim 1, wherein said parcel shelf comprises a lower supporting part and a covering on top of said lower supporting part.

3. The hardtop according to claim 1, wherein said lower supporting part has two lengthwise sides which are permanently connected with respective lower edge areas of said side parts.

4. The hardtop according to claim 1, further comprising a middle part located between said pair of side parts, said rear window being supported at a front edge by a supporting flange of said middle part, said rear window being supported at said transverse sides by a supporting flange of each of said pair of side parts.

5. The hardtop according to claim 2, further comprising a middle part located between said pair of side parts, said rear window being supported at a front edge by a supporting flange of said middle part, said rear window being supported at said transverse sides by a supporting flange of each of said pair of side parts.

6. The hardtop according to claim 4, wherein a rear edge of the rear window is supported by said supporting part.

7. The hardtop according to claim 2, wherein said covering is formed by a plastic part that is provided on an upper side with a covering material.

8. The hardtop according to claim 7, wherein said covering material is selected from the group consisting of foam, rubber, elastomer, and carpeting.

9. The hardtop according to claim 1, wherein said parcel shelf extends only in a rear partial area of lower edges of said side parts, said edges extending lengthwise and to be engaged with a fixed body portion of said automobile.

10. The hardtop according to claim 1, further comprising components of releasable latches mounted on a forward lateral portion of said parcel shelf.

11. The hardtop according to claim 1, wherein said parcel shelf is configured to cover a rear folding top storage compartment in an assembled position in the automobile.

12. A removable hardtop for an automobile, comprising:
    a hardtop body having a pair of side portions which at least partially define opposite transverse edges of an opening for a rear window, said side portions extending at least partially downwardly from said transverse edges; and
    a shelf arranged below said opening, said shelf extending transversely between said pair of side portions and being coupled to each of said side portions.

13. The removable hardtop according to claim 12, further comprising a rear window coupled to said pair of side portions at said transverse edges.

14. The removable hardtop according to claim 12, wherein said shelf is permanently coupled to each of said side portions.

* * * * *